Figure 1:
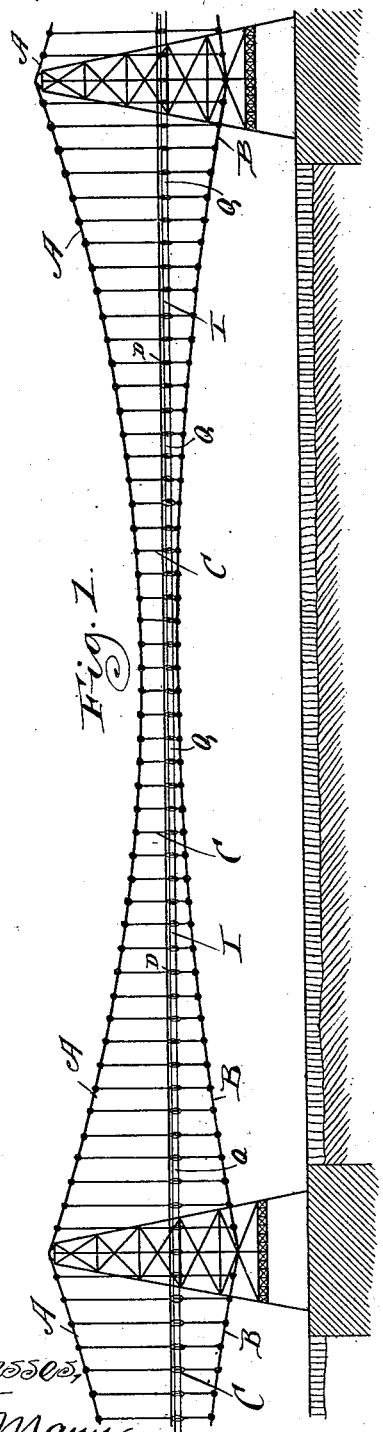

(No Model.)  4 Sheets—Sheet 1.

ST. JOHN V. DAY.
ELEVATED RAILWAY.

No. 472,862.  Patented Apr. 12, 1892.

Witnesses,

Inventor,
St. John V. Day (No Model.) ST. JOHN V. DAY.
ELEVATED RAILWAY.

No. 472,862. Patented Apr. 12, 1892.

Witnesses, Inventor, (No Model.) 4 Sheets—Sheet 3.
ST. JOHN V. DAY.
ELEVATED RAILWAY.
No. 472,862. Patented Apr. 12, 1892.
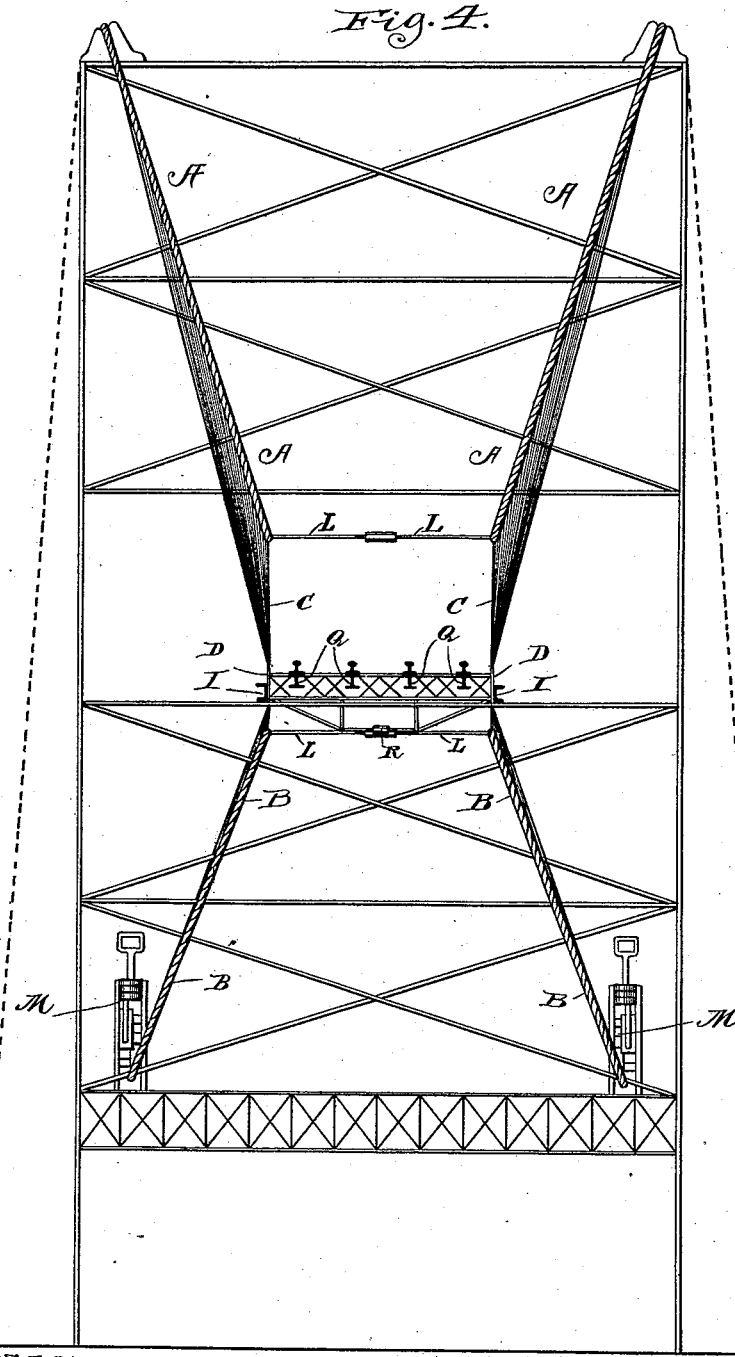

(No Model.) 4 Sheets—Sheet 4.
ST. JOHN V. DAY.
ELEVATED RAILWAY.
No. 472,862. Patented Apr. 12, 1892.
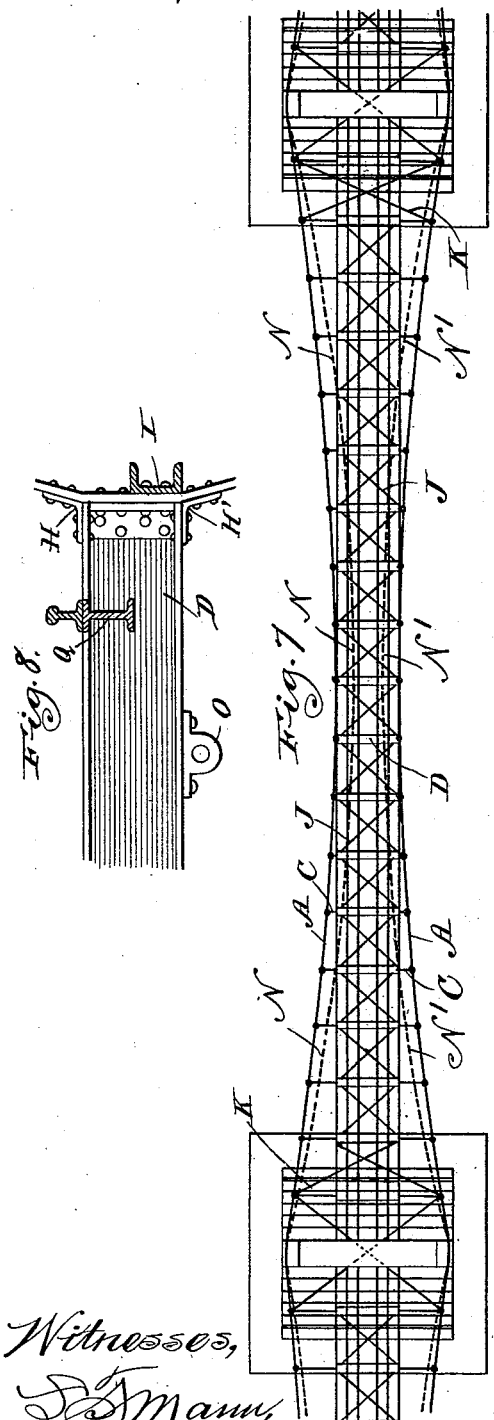
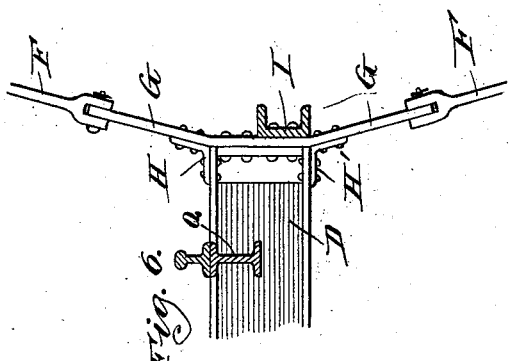
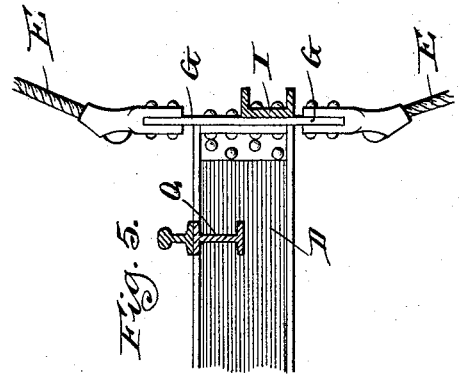
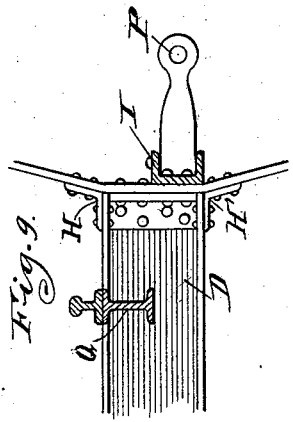

UNITED STATES PATENT OFFICE.

ST. JOHN V. DAY, OF CHICAGO, ILLINOIS, ASSIGNOR TO THE DAY ELEVATED RAILWAY PLANT COMPANY, OF SAME PLACE.

ELEVATED RAILWAY.

SPECIFICATION forming part of Letters Patent No. 472,862, dated April 12, 1892.

Application filed December 31, 1890. Serial No. 376,323. (No model.)

*To all whom it may concern:*

Be it known that I, ST. JOHN V. DAY, of Devonshire, England, but now residing in Chicago, Illinois, have made a new and useful Improvement in Elevated Railways, of which the following is a clear, full, and exact description.

My improvement in elevated railways has for its object to lighten the structure and at the same time to increase its stiffness to resist lateral or wind stress.

The class of elevated railways to which my improvement relates is that which is mainly composed of cables in tension, each pair of cables being curved—one downward and the other upward—in directions opposed to each other. In elevated railways of this class as hitherto proposed to be constructed the cables have been arranged in vertical planes from end to end of the structure and parallel to each other. Under my present improvement I not only curve the upper and under cables in directions opposed to each other, but I incline them in a transverse direction also, so that the cables in the two sides of each bay have a transverse inclination opposed to each other—that is to say, the inclination of one side of the structure is opposed to the inclination of the opposite side of the structure—the cables being farther apart at the ends than at the center of each bay. Under this improved construction in place of the upper and under cables being connected together by vertical ties, as has hitherto been proposed, vertical ties are dispensed with and each upper and under cable is connected to the floor-beams by inclined ties, and the floor-beams again connect the opposite inclined sets or rows of ties together. This connection to the floor-beams of the cables thus curved in two opposite directions and inclined puts the floor-beams into tension, and as these couple the two sides of each bay of the structure together transversely it follows that every part of the structure constituting a bay is therefore in its normal condition in a state of tension stress. The floor-beams are connected longitudinally by stringers, upon or above which the rails may be carried, which may be either rails of the ordinary kind or cable-rails in tension, accordingly as the particular railway to which my improvement is applied is either a rigid rail or a stretched-cable railroad. Under my present improvement diagonal bracing is also preferably used in the open floor-space of the structure, as hereinafter described, and carried through the towers or piers of the structure, so as to connect the several bays continuously together and horizontally. When the floor-beams, stringers, and horizontal diagonal bracing between them are strong enough, the curvature and inclination of the upper and under reversely-curved pairs of cables hereinbefore referred to and the inclined connecting-ties between these upper and under curved cables render further horizontal bracing in some cases unnecessary. Further or additional horizontal bracing may, however, be applied with considerable advantage, in order to impart lateral stiffness to the structure, and under my present improvement I effect this by means of a pair of reversely-curved cables laid in a horizontal or practically-horizontal plane through the structure. These last-mentioned cables are passed through attachments fixed to the horizontal transverse floor-beams, approaching gradually nearer together at the center and diverging farther apart at the ends. At the ends these horizontally-curved cables are attached to the towers or piers and braced horizontally by tension stress being applied to them either in each or every alternate tower or pier. This tension stress of the horizontally-curved cables may be a permanent tension stress; but one or both ends of the cables are by preference attached to compensating tension devices placed in the towers or piers. As an equivalent of these horizontal cables the ends of the floor-beams may be connected to a channel-iron or to an I-beam, or to a box-girder extending from end to end of each bay. Under this improvement I have nearly all parts of the structure so completely in tension that I am able to dispense with the central cables and ties which have hitherto been proposed to be used for carrying part of the load and the rail-supports of the structure, so that I now under my present improvement carry two or more lines of rails side by side between two pairs or sets of tied or braced cables which constitute the sides of each bay.

In order to use floor-beams as light as possible, they may be trussed on their under sides, as hereinafter described.

In the drawings the several parts of the improvement are of necessity shown more or less detached from each other, but they nevertheless form parts of a system and are operated together.

Figure 2:
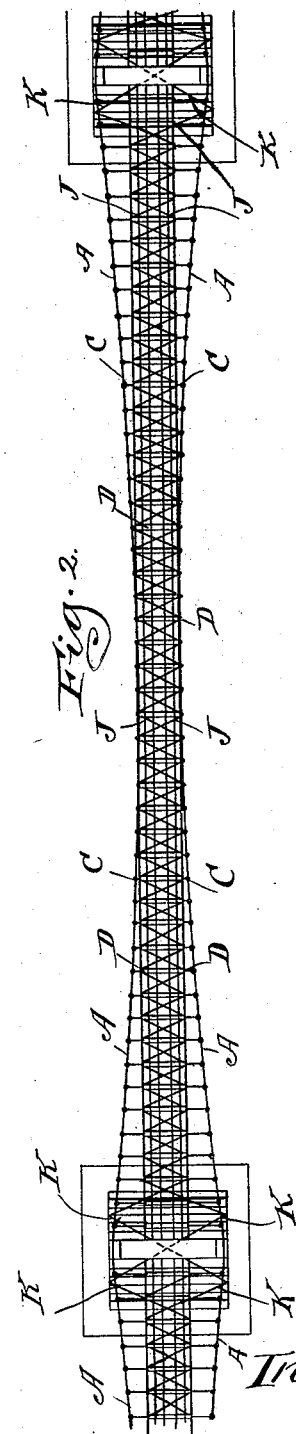
Figure 3:
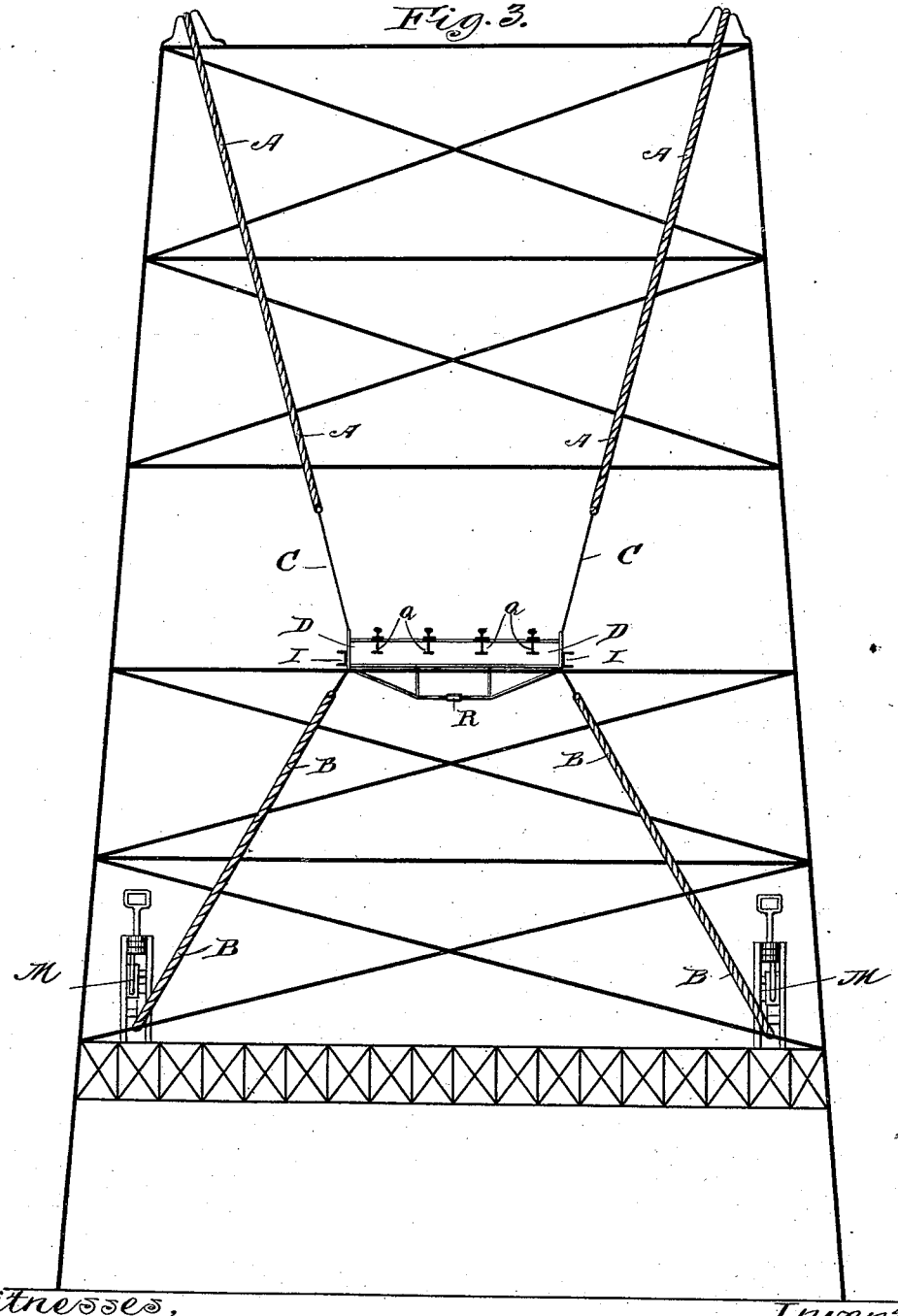

Figure 1 is a diagram representing in outline one entire span or bay and portions of two adjacent spans or bays of a braced elevated railway of the kind herein mentioned and showing a portion of my present improvement. Fig. 2 is a plan of the same, showing a double line of railway. Fig. 3 is a diagram on a larger scale, showing a transverse view, partly in section and part in end elevation, of the elevated railway constructed according to my present improvement. Fig. 4 is another diagram, on an enlarged scale, showing a similar transverse view to Fig. 3, but having cross-ties at the center part of the span or bay for imparting additional rigidity to the structure. Fig. 5 is an enlarged view of one end of a floor-beam, showing the preferred mode of applying inclined ties of cable for connecting the floor-beams to the upper and under cables. Fig. 6 is a similar view to Fig. 5, but having stiff inclined ties instead of inclined ties formed by cables, as in Fig. 5. Fig. 7 is a diagram plan of one span and portions of two adjoining spans of that part of my improvement, whereby I brace the structure against lateral or wind stress by means of horizontally-curved cables. Fig. 8 is an elevation of a portion of one end of a floor-beam, showing an attachment at the under side for the horizontally-curved cable at or about the center part of the span or bay. Fig. 9 is an elevation of one end of a floor-beam at or near the end of the span or bay, showing a projected attachment for the adjacent part of the horizontally-curved bracing-cables.

The same letters of reference denote the same parts in all the figures.

In Figs. 1 and 2 the upper cables A and the under cables B are not only curved in directions opposed to each other upward and downward, but they incline outward in opposite directions from each other, as is more particularly seen in Fig. 2. By this arrangement of the upper and under cables they are farther apart transversely at their ends than at the central parts of the span or bay, and the ties C, connecting these cables A and B together, are also connected to the ends of the floor-beams D, which beams throughout every span or bay are preferably of equal lengths. The relationship of the ties C to the other parts of the structure causes these ties C to incline or spread outward laterally both above and below the open floor, at the same time putting the floor-beams into a state of tension to the extent of the horizontal components of the tension stresses upon the inclined ties C.

The floor-beams D are connected to the upper and under cables A and B either by means of ties formed of cable, as shown at E, Fig. 5, or they may be stiff bars of iron or steel, as shown at F, Fig. 6. In either case these inclined ties are connected to the ends of the floor-beams D by coupling-pieces G, which are strongly attached to the ends of the floor-beams D by angle-irons H and H', as shown at Figs. 6, 8, and 9. The angle-irons H and H' are omitted in Fig. 5; but it is to be understood that they are preferably to be used therein also.

To impart additional lateral stiffness to the structure, a continuous channel-iron I is attached to the end of each floor-beam, as shown at both sides of the structure, the said structure being also braced horizontally by the diagonal bracing J; but instead of that diagonal bracing terminating, as it has done heretofore, in each span or bay of the structure, it is under my present improvement continued through the piers or towers by the diagonal rods K. (Shown in Fig. 2.) In this way entire continuity of horizontal bracing of the railway for any required length thereof is obtained from end to end of the structure over any required number of spans or bays. When the ties C, connecting the upper and under cables A and B to the floor-beams D, are joined together transversely at their upper and under sides, respectively—that is to say, above and below the floor-beams D by horizontal ties L, as shown at Fig. 4—then the ties C at the central parts of the spans or bays may be thrown into a vertical position, as at Fig. 4. The lower cables B are connected at their ends to compensating tension devices M, Figs. 3 and 4, which may be devices of such a kind as those described in my application for patent having the Serial No. 374,626, dated December 13, 1890.

In Fig. 7 the cables for braced horizontal elevated railways of the class under consideration are shown at N and N' in dotted lines. These cables are passed at the central parts of each span or bay through an eye attachment, such as O in Fig. 8, and toward the ends of the span, where the horizontal cables spread out laterally to a width apart greater than the length of the floor-beams D, the cables are passed through links—such as P—attached to the ends of the floor-beams. These links P are of graduated lengths, so as to admit of the requisite curvatures N and N'.

I wish it understood that when the braced cables—such as N and N'—are used the channel-irons I may be dispensed with, or the cables N and N' may be used in combination with the channel-irons I. One or both ends of each of the horizontally-curved cables N and N' is or may be connected to a compensating tension device, such as those marked M in Figs. 3 and 4, hereinbefore referred to. When a compensating tension device is used in the towers or piers of the structure for maintaining the requisite tension stress in the horizontally-curved cables N and N', it is of course placed in the said towers or piers at a level corresponding to the level of the cables N and N' themselves. The horizontally-braced cables N and N' may also be used in elevated railways of cable construction, wherein the sides of the spans instead of being inclined to each other, as shown in the annexed drawings, are parallel.

The floor-beams D of each span are connected together by horizontal stringers Q, over or upon which the rails are laid with either vulcanized india-rubber, vulcanized fiber, wood, or other suitable elastic medium and non-conductor of sound placed between the rails and stringers of the boor-beams, and when using rails of continuous cables, such as are sometimes used in railways of the class to which my present improvement relates, these rail-cables are carried upon brackets or continuous supports, supported on the stringers and floor-beams at the requisite height above the stringers and floor-beams to allow of the proper transit of vehicles which travel thereon. The floor-beams D are preferably trussed on the under side, as shown at R, Figs. 3 and 4, and provided with a nut and screws on the horizontal tension-bars for tightening the same to the requisite degree of tension.

In this specification I do not broadly claim a suspension-bridge having horizontal curved cables secured to the spans thereof and strengthening them against wind-pressure, as such a construction is claimed in an application filed by me in the United States Patent Office on January 24, 1891, serially numbered 378,915.

I claim—

1. In elevated railways of the kind herein referred to, the upper and under curved cables inclined in reverse directions, so that the structure not only spreads outward laterally both above and below the floor-beams, but the cables themselves are farther apart vertically at the ends of a span or bay than at the center thereof, substantially as described.

2. In elevated railways of the kind referred to, the inclined ties connecting the upper and under curved and inclined cables together and these again to the floor-beams, by which the opposite inclinations of the cables and ties at both sides of the structure are effected both above and below the floor-beams and the whole structure maintained in a state of tension stress, substantially as described.

3. In elevated railways of the kind referred to, the diagonal bracing of any span or bay combined with that of the next spans or bays by attaching said bracing to the towers or piers and connecting the points of attachment in the towers or piers together by diagonal tie-rods crossing each other horizontally through the towers or piers, substantially as described.

4. In elevated railways of the kind referred to, the combination of the inclined upper and lower curved cables, the inclined upper and lower ties, the floor-beams, the stringers, rails upon and above the stringers, and the towers or piers, with continuous horizontal diagonal bracing connecting the spans or bays together through said towers or piers, substantially as described.

5. The channel-irons connecting the ends of the floor-beams at opposite sides of the spans or bays so as to stiffen the spans or bays against lateral or wind stress, substantially as described.

6. The combination of the channel-irons, floor-beams, inclined cables, inclined ties, stringers, rails, horizontal bracing, and towers or piers for producing an elevated-railway structure, substantially as described.

7. In an elevated-railway structure of the kind described, the combination, with towers, of cables carried thereby, floor-beams carried by the said cables, links projecting from the ends of the said beams and eyes secured to the lower surface thereof, and horizontally-curved cables passing through the said links and eyes, as described.

8. In an elevated-railway structure, the combination of the inclined upper and lower cables, the inclined upper and lower ties connected thereto and to the floor-beams, piers carrying the said cables, longitudinal stringers connecting the said floor-beams, and rails carried by the said stringers, as described.

9. In an elevated-railway structure, the combination of the inclined upper and lower cables, the inclined upper and lower ties connected thereto and to the floor frames or beams, piers carrying the said cables, and channel-irons connecting the ends of the floor-beams so as to stiffen the spans or bays against lateral or wind stress, as described.

In testimony whereof I have affixed my signature in the presence of two witnesses.

ST. JOHN V. DAY.

Witnesses:
L. J. CADWELL,
M. SPITZER.